July 23, 1968 S. J. LEVANTI 3,394,273
TRANSISTORIZED CUTOFF AMPLIFIER
Filed Feb. 23, 1965
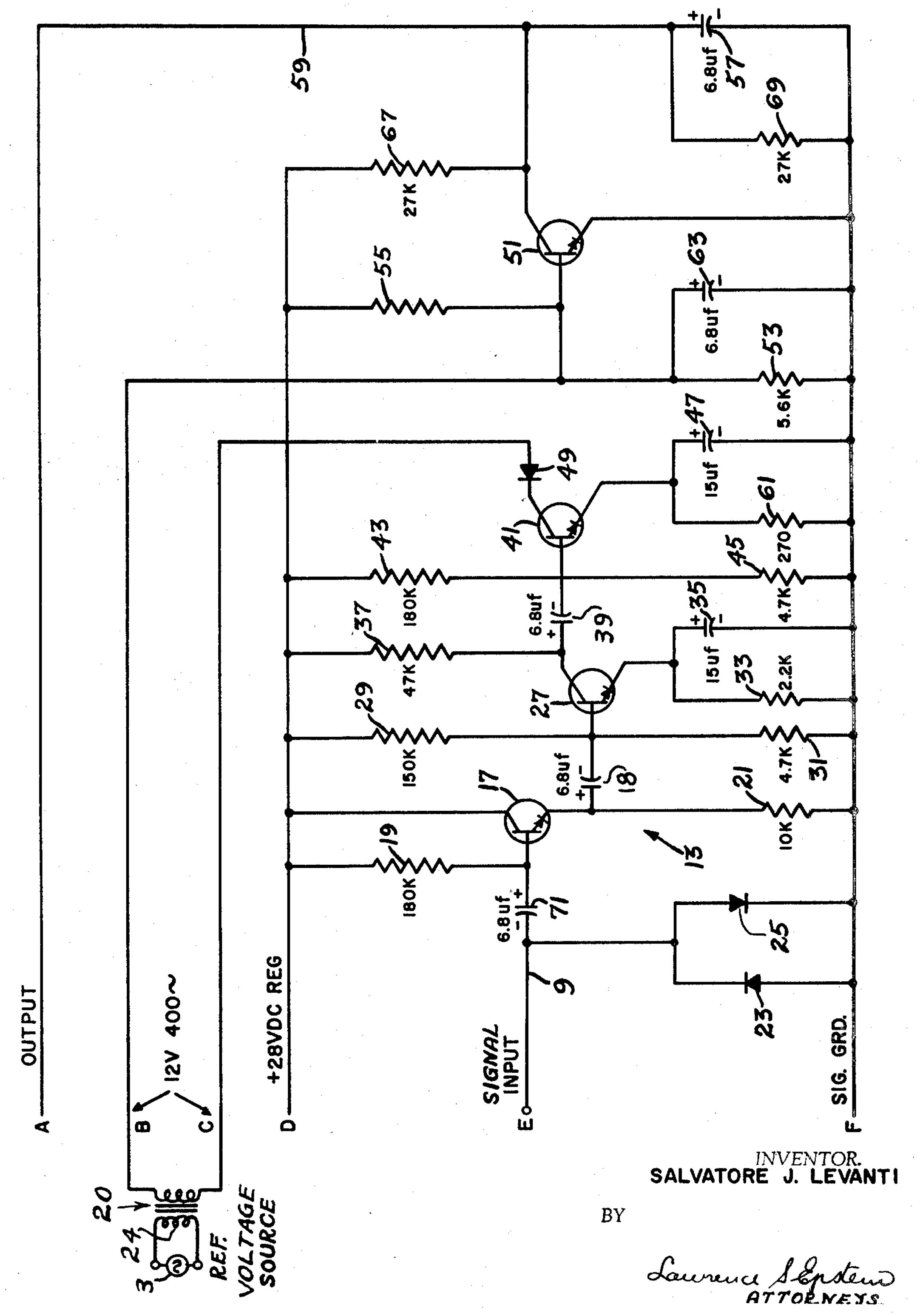
INVENTOR.
SALVATORE J. LEVANTI
BY
Laurence S. Epstein
ATTORNEYS 3,394,273

TRANSISTORIZED CUTOFF AMPLIFIER

Salvatore J. Levanti, Little Neck, N.Y., assignor, by mesne assignments, to the United States of America as represented by the Secretary of the Navy Filed Feb. 23, 1965, Ser. No. 434,723
2 Claims. (Cl. 307—295)

ABSTRACT OF THE DISCLOSURE

The invention is a cutoff amplifier which compares a reference voltage with a signal voltage. If there is no signal voltage or if the signal voltage is out of phase with the reference voltage, the cutoff amplifier will have a DC voltage output. If the signal voltage is in phase with the reference voltage, the cutoff amplifier will have no output voltage.

In present invention, the cutoff amplifier has two voltages fed to it; a reference voltage and an input signal voltage, and operates in three different modes. With a zero voltage signal input a positive DC output voltage is seen. When there is an AC input signal voltage which is out of phase with respect to a reference voltage, the output voltage is also a positive DC voltage. However, with an AC input signal voltage which is in phase with the reference voltage, the output of the device is zero volts, and is in what is referred to as the "cutoff" mode of operation. Because of these operating characteristics, the present invention can be utilized in numerous circuit applications which requires an output signal which is a function of the phase relation of an input signal to a fixed or variable reference signal. As a specific application, such as for the earth's curvature cutoff gate circuit in a radar target simulator, the phase of the input signal indicates the relative altitude of a simulated target with respect to the horizon line. When the simulated target falls below the horizon, the input signal changes phase and causes the output of this gate circuit to change to zero volts. This output from the gate circuit would be one of the inputs to an "AND" circuit which gates the simulated target video. Therefore, whenever the output of this gate circuit is zero volts, the target video signal is cutoff.

Therefore, it is one of the objects of this invention to provide a cutoff amplifier for use in a radar target simulator.

Another object of this invention is to provide an electronic device which produces an output signal which is a function of the phase relation of an input signal to a fixed or variable reference signal.

The three different modes of operation results in an electronic device that is virtually fail safe, if in its application, the safe condition requires an output from this device. Therefore, if there is a malfunction, and the device does not receive an input signal or a reference voltage, or even if the first stage of amplification of the device fails, the device will continue to produce an output signal. It is only under conditions of proper operation and appropriate phase relation between the input signal and the reference voltage, that the output is cut off.

Therefore, it is another object of this invention to provide an electronic device which is fail safe.

Other objects and many of the attendant advantages of this invention will be readily appreciated as the same becomes better understood by reference to the following detailed description when considered in connection with the accompanying drawing which describes the electrical schematic diagram of the cutoff amplifier circuit.

Referring to the drawing, the circuit is supplied with a reference voltage from reference voltage source 3, and an input signal from an input voltage source E. The input signal is connected over line 9 to the base of a transistor 17. Resistors 19 and 21 which are connected to transistor 17 provide biasing.

The diodes 23 and 25, connected to the base of transistor 17, limit the applied signal voltage so as to avoid saturating the system and to eliminate spurious signals. The output signal from the emitter of transistor 17 is coupled by a capacitor 18 to the base of transistor 27. Resistors 29 and 31 provide base biasing for transistor 27. Resistor 33 is the emitter resistor, and capacitor 35 is a bypass capacitor used to eliminate AC degeneration. The collector load resistor of transistor 27 is resistor 37. The output signal from transistor 27 is coupled via capacitor 39 to the base of a transistor 41. Resistors 43 and 45 provide base biasing so that transistor 41 conducts when there is no input signal. Capacitor 47 in the emitter circuit of transistor 41 is a bypass capacitor used to eliminate AC degeneration. The cathode of diode 49 is connected to the collector of transistor 41, and the anode of 49 is connected to the lower end of secondary winding 22 of a transformer 20. The primary winding 24 of transformer 20 is connected to reference voltage source 3. The upper end of secondary winding 22 is connected to the junction of resistor 53 and 55, capacitor 63, and the base of transistor 51. Capacitor 57 which is coupled to the output and the collector of transistor 51 provides filtering. The output signal is coupled over line 59, from the collector of transistor 51.

In operation, in the first mode, for a zero input signal coupled to the base of transistor 17, transistor 17 and 27 are both normally in a non-conductive state. For this zero input signal, transistor 41 is biased to conduction by the biasing resistors 43, 45 and 61. Diode 49, resistor 53, capacitor 63 and conducting transistor 41 function as a half-wave rectifier and filter network for the reference voltage. Diode 49 is so connected that the voltage at the junction of the base of transistor 51, resistor 53 and capacitor 63 becomes negative with respect to ground. This negative voltage overcomes the positive voltage due to resistors 53 and 55. The base of transistor 51 therefore goes negative, cutting off transistor 51. The output will then be a high positive voltage, one-half the DC supply voltage, because of resistors 67 and 69.

In the second mode of operation, when the input signal voltage is out of phase with respect to the reference voltage the circuit operates as follows; the input signal is fed over line 9 to the base of transistor 17 through capacitor 71. It is limited by diodes 23 and 25. The input signal is amplified and inverted at the output of transistor 27, and this output signal is then coupled to the base of transistor 41 through capacitor 39. Since the input signal is out of phase with the reference voltage, the input signal to the base of transistor 41 is in phase with the reference signal due to the inversion at the output of transistor 27. Therefore, for a positive swing at the base of transistor 41 and the correct polarity reference voltage to cause conduction in diode 49, transistor 41 conducts and transistor 51 maintains its initial non-conducting state. The circuitry operates in the same manner as it would for a zero input signal in the first mode of operation, thereby resulting in the same positive output signal. For a negative voltage swing at the base of transistor 41, the transistor 41 is cut off as is diode 49, since there is a negative swing at the collector of transistor 41.

In the third mode of operation, the input signal on line 9 is in phase with the reference voltage from reference voltage source 3, and the signal voltage will be inverted at the collector output of transistor 27 as in the first mode of operation. Since this voltage will appear at the base of transistor 41 out of phase with the reference voltage at diode 49, transistor 41 will not conduct and there will be no rectification of the reference voltage to maintain the base of transistor 51 negative as in the second mode of operation. Therefore, a positive voltage will be applied to the base of transistor 51 by the voltage divider comprising resistors 55 and 53. This causes transistor 51 to conduct continuously thereby shorting the 14 volt output voltage on output line 59 which is developed across the voltage divider comprising resistors 67 and 69 in the first and second modes of operation.

When there is an input signal which is in phase with the reference signal at point 73, the third mode of operation, the input to the base of transistor 41, is out of phase with the reference signal 1. In this state, transistor 41 is biased to cut off. The collector at this time is positive. When the reference signal reverses phase, the collector is opened, since the diode 49 is then back biased. Therefore, at no time in this third mode of operation, does transistor 41 conduct. There is no rectification in this condition. The base of transistor 51 being biased positively, due to the resistors 53 and 55, causes transistor 51 to conduct and forces the output to zero volts.

Obviously many modifications and variations of the present invention are possible in the light of the above teachings. It is therefore to be understood that within the scope of the appended claims the invention may be practiced otherwise than as specifically described.

What is claimed is:

1. A cut-off amplifier which when supplied with an input signal and a reference voltage provides an output signal which is a function of the phase relation of the input signal to the reference voltage, comprising:

input signal transmission means, reference voltage transmission means, means for amplifying said input signal, transistor rectifier means connected to receive said amplified input signal and said reference voltage so that said transistor rectifier means conducts when said input signal and said reference voltage are out of phase, an output transistor connected across a D.C. voltage source, a voltage divider circuit connected across said D.C. voltage source and to a control terminal of said output transistor, a common resistor connected in said voltage divider circuit and in the emitter circuit of said transistor rectifier means in such manner that when the said transistor rectifier means conducts, current through said common resistor biases said output transistor to cutoff.

2. The apparatus of claim 1 and including a capacitor connected in parallel with said common resistor.

References Cited

UNITED STATES PATENTS

| | | | |
|---|---|---|---|
| RE. 24,678 | 8/1959 | Pinckaers | 307—88.5 |
| 2,897,379 | 7/1959 | Hindale | 307—88.5 |
| 3,065,361 | 11/1962 | Brook | 307—88.5 |
| 3,093,786 | 6/1963 | Nelson et al. | 307—88.5 |
| 3,123,813 | 3/1964 | Baude | 307—88.5 |
| 3,188,482 | 6/1965 | Woodworth et al. | 307—88.5 |
| 2,911,545 | 11/1959 | Pinckaers | 307—88.5 |

ARTHUR GAUSS, *Primary Examiner.*

H. DIXON, *Assistant Examiner.*